US010138070B2

(12) United States Patent
Li et al.

(10) Patent No.: US 10,138,070 B2
(45) Date of Patent: Nov. 27, 2018

(54) FRICTION CONVEYING SYSTEM

(71) Applicant: Guangzhou MINO Automotive Equipment Co., Ltd., Guangzhou (CN)

(72) Inventors: Junhui Li, Guangzhou (CN); Meng Yang, Guangzhou (CN); Hongchen Zhang, Guangzhou (CN); Zhencheng Chen, Guangzhou (CN); Qing Li, Guangzhou (CN)

(73) Assignee: Guangzhou MINO Automotive Equipment Co., Ltd., Guangzhou (CN)

( * ) Notice: Subject to any disclaimer, the term of this patent is extended or adjusted under 35 U.S.C. 154(b) by 0 days.

(21) Appl. No.: 15/819,805

(22) Filed: Nov. 21, 2017

(65) Prior Publication Data

US 2018/0072507 A1 Mar. 15, 2018

Related U.S. Application Data

(63) Continuation of application No. PCT/CN2016/080291, filed on Apr. 27, 2016.

(30) Foreign Application Priority Data

Mar. 7, 2016 (CN) .......................... 2016 1 0128073

(51) Int. Cl.
*B65G 25/06* (2006.01)
*B65G 13/06* (2006.01)

(52) U.S. Cl.
CPC .......... *B65G 25/065* (2013.01); *B65G 13/06* (2013.01); *B65G 2812/12* (2013.01)

(58) Field of Classification Search
CPC .................................................... B65G 25/065
USPC ...................................................... 198/750.1
See application file for complete search history.

(56) References Cited

U.S. PATENT DOCUMENTS 5,572,930 A * 11/1996 Hein .................... B66B 9/0815
104/128

* cited by examiner

*Primary Examiner* — Gene O Crawford
*Assistant Examiner* — Lester Ill Rushin
(74) *Attorney, Agent, or Firm* — M&B IP Analysts, LLC.

(57) ABSTRACT

Disclosed is a friction conveying system, comprising a friction driving unit, a clamping unit and a friction driving component, wherein the friction driving unit comprises a rotation driving component, a first connecting rod, a second connecting rod, at least one first rollers arranged on the first connecting rod, and at least one second rollers arranged on the second connecting rod, the clamping unit comprises a clamping driving component by which the first connecting rod and the second connecting rod are moved towards each other to cause the first rollers and the second rollers to clamp the friction driving component, the first rollers and/or the second rollers are drivable by the rotation driving component to rotate, causing the friction driving component clamped between the first rollers and the second rollers to move by means of frictional force. According to the invention, the rollers are used to drive the friction driving component to move at a high speed by means of frictional force, providing high-speed conveyance at lower cost. The present invention has the advantages of lower cost, reliable performance, and convenient mounting, satisfying the conveying requirements of industrial automatic production line.

9 Claims, 5 Drawing Sheets

16
17
112
113
14
114
18
19
1
13
11
121
120
21
2
12
21

FRICTION CONVEYING SYSTEM

CROSS-REFERENCE TO RELATED APPLICATIONS

This application is a continuation application of an International Application No. PCT/CN2016/080291 filed Apr. 27, 2016, which claims priority under 35 USC 119 from Chinese Application No. 201610128073.8 CN, filed Mar. 7, 2016, now pending.

TECHNICAL FIELD

The present invention relates to the field of industrial automatic equipment, and more particularly to a friction conveying system.

BACKGROUND

With the economic globalization, and the pursuit of high efficiency in production, intelligentized production is an irreversible trend. At the same time, as the people's living standard rising and therefore the labor cost increasing, it is particularly important for automatic industrial manufacture and development. Automatic conveying system is the aorta of the entire industrial production line, providing a high-speed conveying at a certain distance. Currently, for such a long-distance load conveying, typically gear-rack drive, belt conveyor, linear guide slider and roller for guiding are used. However, those driving and guiding methods adopted for the conventional conveying systems post higher accuracy requirements on parts machining, equipment installation and commissioning, and the current friction conveying systems of the prior art have a problem that there exists a short period of time during which the load conveyed is not driven between stations.

SUMMARY

In order to solve the above-mentioned problems, the aim of the invention is to provide a friction conveying system which is driven by roller friction force, featuring in low-cost and high-speed conveyance.

The technical solution adopted by the invention to solve the technical problems can be summarized as:

A friction conveying system, comprising:

a friction driving unit, comprising:

a rotation driving component;

a first connecting rod;

a second connecting rod;

at least one first roller arranged on the first connecting rod; and at least one second roller arranged on the second connecting rod;

a clamping unit, comprising a clamping driving component; and a friction driving component;

wherein:

driven by the clamping driving component, the first connecting rod and the second connecting rod move towards each other, to cause the at least one first roller and the at least one second roller by circumferential surfaces thereof to clamp the friction driving component; and driven by the rotation driving component, the at least one first roller and/or the at least one second roller rotate to cause the friction driving component clamped between the at least one first roller and the at least one second roller to move by means of frictional force.

As a further improvement to the above-mentioned technical solution, the at least one first roller comprises a main driving roller and an auxiliary driving roller arranged on the first connecting rod in a conveying direction and driven by the rotation driving component to rotate synchronously, and the at least one second roller comprises two driven rollers arranged on the second connecting rod in the conveying direction and corresponding to the main driving roller and the auxiliary driving roller respectively.

As a further improvement to the above-mentioned technical solution, the rotation driving component comprises a first driving shaft mounted on the first connecting rod via a first roller mount; the first driving shaft is provided with a main driving roller above the first connecting rod and a first synchronous gear below the first connecting rod; the first connecting rod is provided with a second driving shaft, which is mounted on the first connecting rod via a second roller mount, and which is provided with an auxiliary driving roller above the first connecting rod and a second synchronous gear below the first connecting rod, wherein the first synchronous gear and the second synchronous gear are connected via a synchronous belt.

As a further improvement to the above-mentioned technical solution, the friction conveying system further comprises:

a first sleeve, arranged between the first driving shaft and the first roller mount, and comprising a first inner sleeve arranged on the first driving shaft and a first outer sleeve arranged within the first roller mount, wherein, bearings are provided on both sides of the first sleeve, between the first driving shaft and the first roller mount; and a second sleeve, provided between the second driving shaft and the second roller mount, and comprising a second inner sleeve arranged on the second driving shaft and a second outer sleeve arranged within the second roller mount, wherein bearings are provided on both sides of the second sleeve, between the second driving shaft and the second roller mount.

As a further improvement to the above-mentioned technical solution, the rotation driving component comprises a motor arranged on the first connecting rod via a motor mount, wherein, the motor mount comprises a torsion arm seat arranged on the first connecting rod and a torsion arm, to which the motor is fixed, mounted on the torsion arm seat by a positioning pin.

As a further improvement to the above-mentioned technical solution, the second connecting rod is provided with two driven roller mounts each of which is coupled with the driven roller above the second connecting rod via a bearing and a first retainer.

As a further improvement to the above-mentioned technical solution, the clamping driving component comprises a cylinder, and each of the first connecting rod and the second connecting rod is provided with a cylinder mount at a bottom thereof, the cylinder has a piston rod hinged to the cylinder mount at a bottom of the first connecting rod and a cylinder block hinged to the cylinder mount at a bottom of the second connecting rod.

As a further improvement to the above-mentioned technical solution, each of the first connecting rod and the second connecting rod is provided with two swing components at a bottom thereof, each of the swing components comprises a swing arm having a shaft hole in a middle portion thereof, an eccentric shaft arranged and rotatable in the shaft hole, a fixing shaft hole eccentrically provided in the eccentric shaft, and a fixing shaft arranged and rotatable in the fixing shaft hole, wherein the first connecting rod and the second connecting rod are fixedly connected with the swing arm of each of the swing components.

As a further improvement to the above-mentioned technical solution, the friction conveying system further comprises:

a third sleeve, arranged between the fixed shaft and the eccentric shaft, which comprises a third inner sleeve arranged on the fixed shaft and a third outer sleeve arranged within the fixed shaft hole of the eccentric shaft, wherein an inner bearing, as well as a second retainer and an inner ring upper cover for locking the inner bearing, are provided on both sides of the third sleeve, between the fixed shaft and the eccentric shaft;

a fourth sleeve, arranged between the eccentric shaft and the swing arm, which comprises a fourth inner sleeve arranged on the eccentric shaft and a fourth outer sleeve arranged on the inside of the shaft hole of the swing arm, wherein an outer bearing, as well as an outer ring upper cover and an outer ring lower cover for locking the outer bearing, are provided on both sides of the fourth sleeve, between the eccentric shaft and the swing arm.

As a further improvement to the above-mentioned technical solution, the friction driving component comprises a friction driving rod, and an active pin and an auxiliary positioning pin arranged on the friction rod and capable of fitting into a hole in a conveyed load.

According to the invention, in operation, the first connecting rod and the second connecting rod are driven by the clamping driving unit to move towards each other, causing the first rollers and the second rollers into tight contacts with the friction driving component, for transmitting the power from the rotation driving component to the friction driving component, eventually to drive the friction driving component to move the load. In case of conveyances of long-distance, high-speed, high-precision in industrial manufacturing automatic lines, the use of conventional robots for gripping results in lower production efficiency and higher costs, the use of conventional automated conveyances with linear guide sliders for positioning posts higher requirements on equipment installation and machining accuracy, and the use of gear-rack driving increases production costs. According to the invention, a low-cost and high-speed conveyance is achieved by means of a high-speed driving of rollers. The friction conveying system of the invention has the advantages of lower costs, reliable performance, and convenient mounting, satisfying the requirements of industrial automatic production line on conveying.

BRIEF DESCRIPTION OF THE DRAWINGS

The present invention will now be further described by detailed embodiments, with reference to the accompanying drawings, in which.

DETAILED DESCRIPTION

Figure 1:
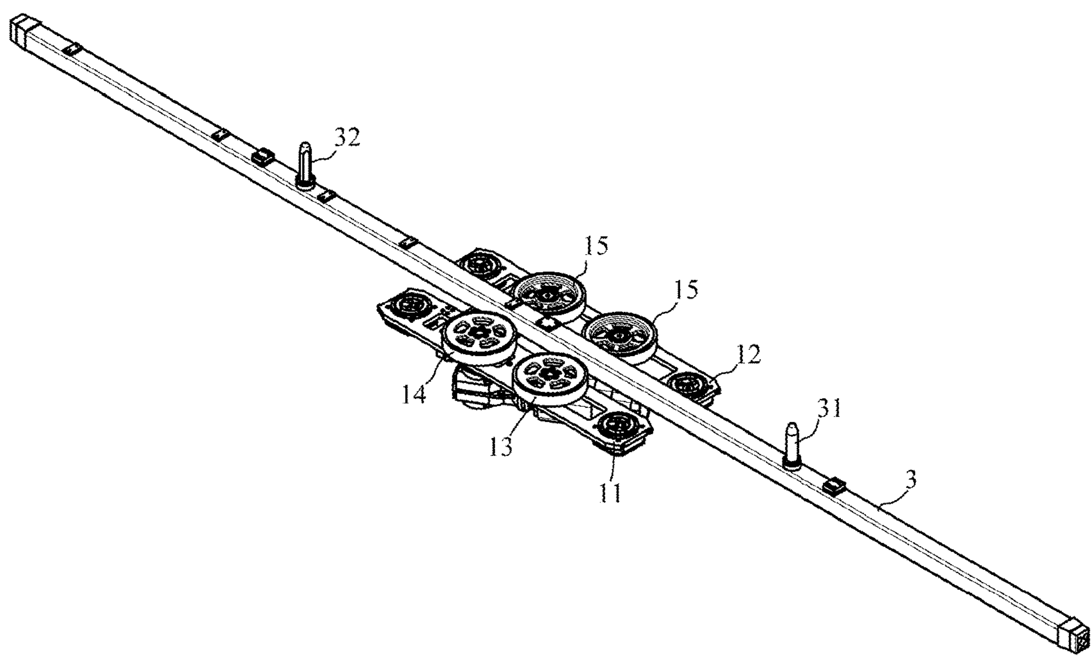
FIG. 1 is a schematic view of a friction conveying system of the present invention.
Figure 2:
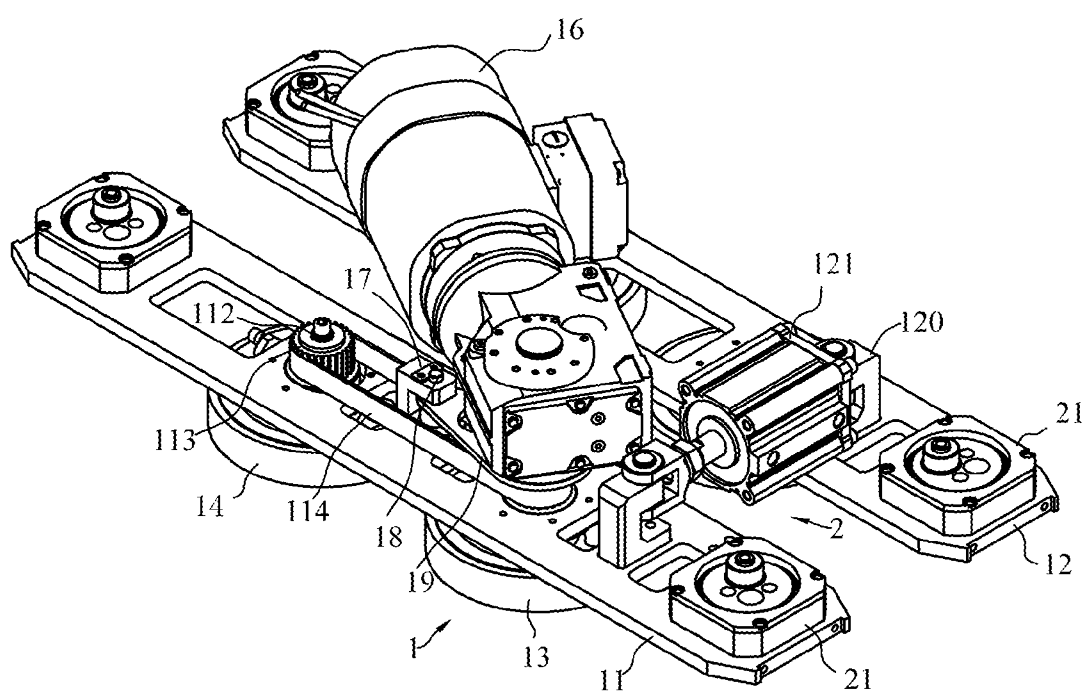
FIG. 2 is a schematic view of a friction driving unit and a clamping unit of the present invention.
Figure 3:
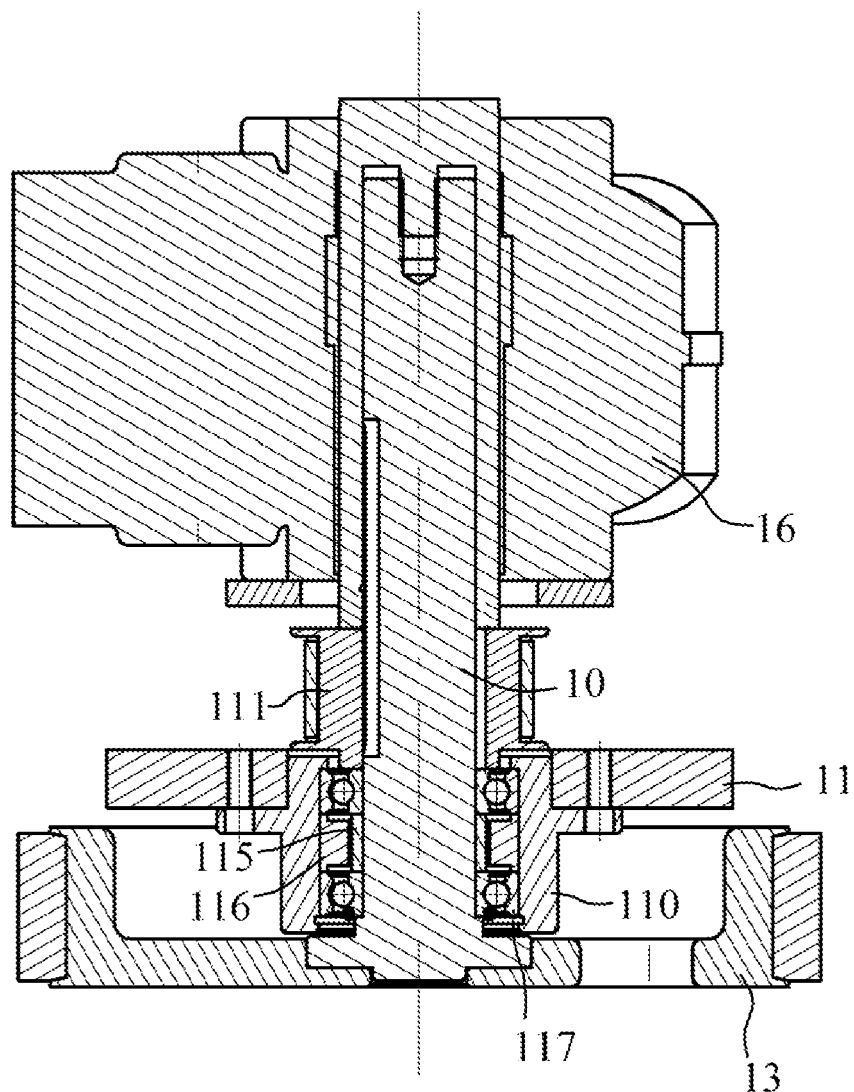
FIG. 3 is a schematic view of the connection between a first driving shaft and a main driving roller of the present invention.
Figure 4:
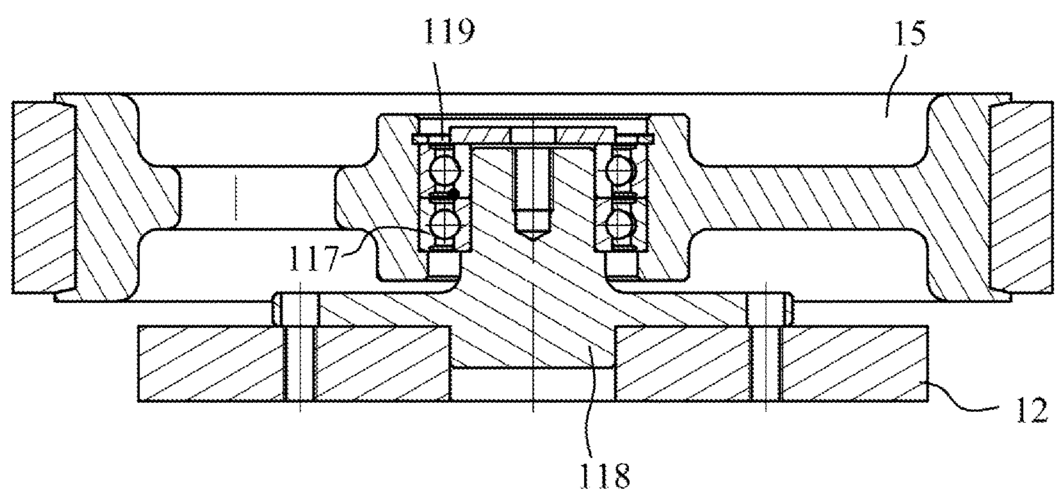
FIG. 4 is a schematic view of the connection between a driven roller mount and a driven roller of the present invention.
Figure 5:
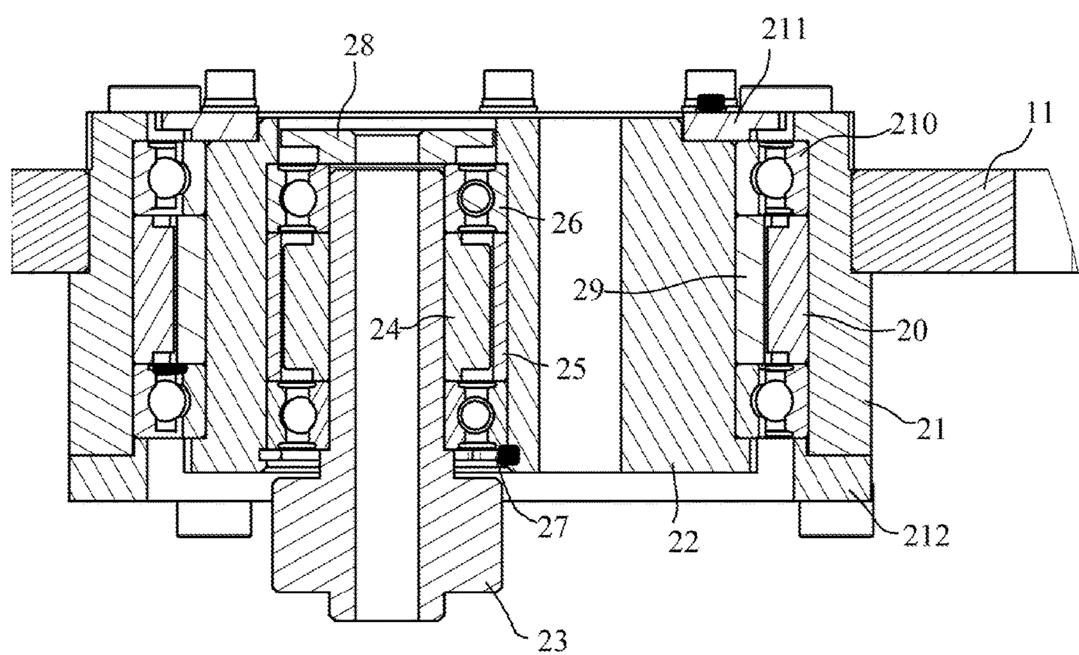
FIG. 5 is a schematic view of a swing component of the present invention.

Referring to FIGS. 1-5, structures of a friction conveying system according to a preferred embodiment of the invention are shown. The structural features of individual elements of the present invention will be described in detail below, and if any direction (above, below, left, right, front and rear) is described, it is taken with reference to the structure shown in FIG. 1. However, the actual use of direction according to the present invention is not limited to this.

The present invention provides a friction conveying system comprising a friction driving unit 1, a clamping unit 2 and a friction driving component. The friction driving unit 1 comprises a rotation driving component, a first connecting rod 11, a second connecting rod 12, a plurality of first rollers arranged on the first connecting rod 11, and a plurality of second rollers arranged on the second connecting rod 12. The clamping unit 2 comprises a clamping driving component configured to press the first connecting rod 11 and the second connecting rod 12 towards each other, thereby to enable the first rollers and the second rollers by their outer circumferential surfaces to clamp the friction driving component. The rotation driving component is configured to drive the first rollers and/or the second rollers to rotate, thereby to move the friction driving component clamped between the first rollers and the second rollers forward by means of frictional force. The friction driving component comprises a friction driving rod 3. The friction driving rod 3 is provided with an active pin 31 and an auxiliary positioning pin 32 arranged thereon and configured to fit into corresponding holes in an item to be conveyed. By fitting the active pin 31 and the auxiliary positioning pin 32 into the holes in the item to be conveyed, and driven by the friction driving unit 1 and the clamping unit 2, loads are conveyed to respective stations.

Specifically, the first rollers comprise a main driving roller 13 and an auxiliary driving roller 14 provided on the first connecting rod 11 in a conveying direction and driven by the rotation driving component to rotate synchronously. The second rollers comprise two driven rollers 15, corresponding to the main driving roller 13 and the auxiliary driving roller 14 respectively, provided on the second connecting rod 12 in the conveying direction. The rotation driving component comprises a motor 16, and a motor mount via which the motor 16 is arranged on the first connecting rod 11. The motor mount comprises a torsion arm seat 17 arranged on the first connecting rod 11, a torsion arm 19, and a positioning pin 18 via which the torsion arm 19 is mounted on the torsion arm seat 17. The motor 16 is fixedly mounted on the torsion arm 19 so as to obtain a slight degree of freedom of swing. The rotation driving component comprises a first driving shaft 10 mounted on the first connecting rod 11 via a first roller mount 110. The main driving roller 13 is mounted on the first driving shaft 10, above the first connecting rod 11, and the first driving shaft 10 is provided with a first synchronous gear 111 arranged below the first connecting rod 11. The first connecting rod 11 is provided with a second driving shaft 112 mounted on the first connecting rod 11 via a second roller mount. The auxiliary driving roller 14 is mounted on the second driving shaft 112, above the first connecting rod 11, and the second driving shaft 112 is provided with a second synchronous gear 113 below the first connecting rod 11. The first synchronous gear 111 is connected with the second synchronous gear 113 via a synchronous belt 114. A first sleeve is provided between the first driving shaft 10 and the first roller mount 110, which comprises a first inner sleeve 115 arranged on the first driving shaft 10 and a first outer sleeve 116 arranged within the first roller mount 110. A bearing 117 is provided on either side of the first sleeve, between the first driving shaft 10 and the first roller mount 110. A second sleeve is provided between the second driving shaft 112 and the second roller mount, which comprises a second inner sleeve arranged on the second driving shaft 112 and a second outer sleeve arranged within the second roller mount. A bearing is provided on either side of the second sleeve, between the second driving shaft and the second roller mount. The second connecting rod 12 is provided with driven roller mounts 118 coupled with the driven rollers 15, respectively, above the second connecting rod 12. Each of the driven rollers 15 is coupled with one of the driven roller mounts 118 via a bearing 117 and a first retainer 119.

The first driving shaft 10 has a rotational degree of freedom only due to a combination of the first roller mount 110, the first inner sleeve 115, the first outer sleeve 116 and the bearing 117. The second synchronous gear 113 is fixed to the second driving shaft 112 by means of a key and a bolt. The second driving shaft 112 is fixed in the same manner as the first driving shaft 10. The driven roller 14 is fixed to the driven roller mount 118 mounted on the second connecting rod 12, via the bearing 117 and the first retainer 119, and is arranged to rotate about the driven roller mount 118 only. The main driving roller 13 obtains power from the motor 16 in rotation. The first synchronous gear 111 is positioned and mounted via a sleeve to the first driving shaft 10 mounted to the motor 16. When the motor 16 rotates, the power is transmitted via the synchronous belt 114 and the first synchronous gear 111 to the auxiliary driving roller 14 mounted on the second driving shaft 112, thereby realizing double-roller driving with a single motor. According to the invention, while passing through the clamping unit 2, the friction driving rod 3 is clamped, and the motor 16 rotates, with the double-roller driving with a single motor, the problem of no driving within a short interval is solved.

According to the invention, the clamping unit 2 drives and releases the friction driving rod mainly through a double four-link mechanism. The clamping driving component comprises a cylinder 121, and a cylinder mount 120 arranged on a bottom of each of the first connecting rod 11 and the second connecting rod 12. The cylinder 121 comprises a piston rod hinged to the cylinder mount 120 at the bottom of the first connecting rod 11, and a cylinder block hinged to the cylinder mount 120 at the bottom of the second connecting rod 12. Each of the first connecting rod 11 and the second connecting rod 12 is provided with two swing components at the bottom thereof. Each of the swing components comprises a swing arm 21 having a shaft hole in the middle thereof and fixed to the first connecting rod 11 or the second connecting rod 12, an eccentric shaft 22 arranged to rotate in the shaft hole and having a fixed shaft hole eccentrically formed therein, and a fixed shaft 23 arranged to rotate in the fixed shaft hole. A third sleeve is provided between the fixed shaft 23 and the eccentric shaft 22, which comprises a third inner sleeve 24 arranged on the fixed shaft 23 and a third outer sleeve 25 arranged within the fixed shaft hole of the eccentric shaft 22. The clamping unit 2 further comprises an inner bearing 26 arranged on either side of the third sleeve between the fixed shaft 23 and the eccentric shaft 22, and a second retainer 27 and an inner ring upper cover 28 for locking the inner bearing 26. A fourth sleeve is provided between the eccentric shaft 22 and the swing arm 21, which comprises a fourth inner sleeve 29 arranged on the eccentric shaft 22 and a fourth outer sleeve 20 arranged within the shaft hole of the swing arm 21. The clamping unit 2 further comprises an outer bearing 210 arranged on either side of the fourth sleeve between the eccentric shaft 22 and the swing arm 21, and an outer ring upper cover 211 and an outer ring lower cover 212 for locking the outer bearing 210.

The fixed shaft 23 is fixed to the base as a support point for the entire double four-link mechanism. The eccentric shaft 22 is fixed by a combination of the inner bearing 26 and the second retainer 27 fixed to the fixed shaft 23. The inner bearing 26 is fixed to the fixed shaft 23 by a combination of the third inner sleeve 24, the third outer sleeve 25, the second retainer 27 and the inner ring upper cover 28, so that the eccentric shaft 22 is only rotatable about it. The outer bearing 210 is fixed to the eccentric shaft 22 by a combination of the fourth inner sleeve 29, the eccentric shaft 22, and the outer ring upper cover 211, while the swing arm 21 is only rotatable about the eccentric shaft 22 by combination of the outer bearing 210, the fourth outer sleeve 29, and the outer ring lower cover 212. The swing arm 21 is fixed to the first connecting rod 11 by means of bolts, and the first connecting rod 11 is provided with two swing components, therefore a four-link mechanism is formed. The four-link mechanism of the second connecting rod works in the same way as that of the first connecting rod. The first connecting rod 11 and the second connecting rod 12 are pressed to move closer to each other by the swing components under the pressure in the cylinder 121, so that the main driving roller 13 and its respective driven roller 15, the auxiliary driving roller 14 and its respective driven wheel 15, mounted on the first connecting rod 11 and the second connecting rod 12, are respectively moved towards each other and brought into close contact with the friction driving rod 3, i.e., the power from the motor 16 is transmitted to the friction driving rod 3, thereby driving the friction driving rod 3 to move.

The present invention is not intended to be limited to the embodiments described above, and it will be apparent to those skilled in the art that equivalents or substitutions may be made without departing from the spirit of the invention, and such equivalents or substitutions are intended to be included within the scope of the claims.

What is claimed is:

1. A friction conveying system, comprising:

a friction driving unit, comprising:

a rotation driving component;

a first connecting rod;

a second connecting rod;

at least one first roller arranged on the first connecting rod; and at least one second roller arranged on the second connecting rod;

a clamping unit, comprising a clamping driving component; and a friction driving component;

wherein:

by the clamping driving component, the first connecting rod and the second connecting rod are moved towards each other, to cause the at least one first roller and the at least one second roller by circumferential surfaces thereof to clamp the friction driving component;

by the rotation driving component, the at least one first roller and/or the at least one second roller are rotated, to cause the friction driving component clamped therebetween to move, by means of frictional force;

the at least one first roller comprises a main driving roller and an auxiliary driving roller arranged on the first connecting rod in a conveying direction and driven by the rotation driving component to rotate synchronously; and the at least one second roller comprises two driven rollers arranged on the second connecting rod in the conveying direction and corresponding to the main driving roller and the auxiliary driving roller respectively.

2. The friction conveying system of claim 1, wherein, the rotation driving component comprises a first driving shaft mounted on the first connecting rod via a first roller mount; the first driving shaft is provided with a main driving roller above the first connecting rod and a first synchronous gear below the first connecting rod; the first connecting rod is provided with a second driving shaft, which is mounted on the first connecting rod via a second roller mount, and which is provided with an auxiliary driving roller above the first connecting rod and a second synchronous gear below the first connecting rod, wherein the first synchronous gear and the second synchronous gear are connected via a synchronous belt.

3. The friction conveying system of claim 2, further comprising:

a first sleeve, arranged between the first driving shaft and the first roller mount, and comprising:

a first inner sleeve arranged on the first driving shaft, a first outer sleeve arranged within the first roller mount, and a bearing arranged on either side of the first sleeve, between the first driving shaft and the first roller mount; and a second sleeve, arranged between the second driving shaft and the second roller mount, and comprising:

a second inner sleeve arranged on the second driving shaft, a second outer sleeve arranged within the second roller mount, and a bearing arranged on either side of the second sleeve, between the second driving shaft and the second roller mount.

4. The friction conveying system of claim 2, wherein, the rotation driving component comprises a motor arranged on the first connecting rod via a motor mount, wherein, the motor mount comprises a torsion arm seat arranged on the first connecting rod and a torsion arm mounted on the torsion arm seat by a positioning pin, and the motor is fixed on the torsion arm.

5. The friction conveying system of claim 1, wherein, the second connecting rod is provided with two driven roller mounts each of which is coupled with one of the driven rollers above the second connecting rod via a bearing and a first retainer.

6. The friction conveying system of claim 1, wherein, the clamping driving component comprises a cylinder, and each of the first connecting rod and the second connecting rod is provided with a cylinder mount at a bottom thereof, the cylinder has a piston rod hinged to the cylinder mount at a bottom of the first connecting rod and a cylinder block hinged to the cylinder mount at a bottom of the second connecting rod.

7. The friction conveying system of claim 6, wherein, each of the first connecting rod and the second connecting rod is provided with two swing components at a bottom thereof, each of the swing components comprises a swing arm having a shaft hole in a middle portion thereof, an eccentric shaft arranged to rotate in the shaft hole and having a fixing shaft hole eccentrically formed therein, and a fixing shaft arranged to rotate in the fixing shaft hole, wherein the first connecting rod and the second connecting rod are fixedly connected with the swing arms of the swing components.

8. The friction conveying system of claim 7, further comprising:

a third sleeve, arranged between the fixed shaft and the eccentric shaft, and comprising:

a third inner sleeve arranged on the fixed shaft, a third outer sleeve arranged within the fixed shaft hole of the eccentric shaft, an inner bearing arranged on either side of the third sleeve between the fixed shaft and the eccentric shaft, a second retainer and an inner ring upper cover for locking the inner bearing, are provided;

a fourth sleeve, arranged between the eccentric shaft and the swing arm, and comprising:

a fourth inner sleeve arranged on the eccentric shaft, a fourth outer sleeve arranged on the inside of the shaft hole of the swing arm, an outer bearing, arranged on either side of the fourth sleeve, between the eccentric shaft and the swing arm, an outer ring upper cover and an outer ring lower cover for locking the outer bearing.

9. The friction conveying system of claim 1, wherein, the friction driving component comprises a friction driving rod, and an active pin and an auxiliary positioning pin arranged on the friction rod and capable of fitting into a hole in an item to be conveyed.

* * * * *